United States Patent
Harris et al.

(10) Patent No.: US 11,384,827 B2
(45) Date of Patent: Jul. 12, 2022

(54) ELECTRIC POWER STEERING POLYMER DRIVE PULLEY

(71) Applicant: Steering Solutions IP Holding Corporation, Saginaw, MI (US)

(72) Inventors: Ryan D. Harris, Clio, MI (US); Dale P. Wawrzyniec, Midland, MI (US); Conrad G. Vorwerck, Bay City, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 415 days.

(21) Appl. No.: 16/694,871

(22) Filed: Nov. 25, 2019

(65) Prior Publication Data
US 2021/0156462 A1 May 27, 2021

(51) Int. Cl.
*F16H 55/17* (2006.01)
*F16H 55/06* (2006.01)
*B62D 5/04* (2006.01)

(52) U.S. Cl.
CPC .......... *F16H 55/171* (2013.01); *B62D 5/04* (2013.01); *F16H 55/06* (2013.01)

(58) Field of Classification Search
CPC .............. B62D 5/0424; F16H 2025/2096; F16H 7/023
USPC ........................................ 474/152, 166, 903
See application file for complete search history.

(56) References Cited

U.S. PATENT DOCUMENTS

| | | | | |
|---|---|---|---|---|
| 5,275,577 A * | 1/1994 | Hildebrandt | .......... | F16D 1/0858 474/166 |
| 5,370,587 A * | 12/1994 | Johnson | .................. | F16H 55/36 474/166 |
| 5,807,180 A * | 9/1998 | Knodle | ................. | F16D 1/0882 464/144 |
| 7,198,425 B2 * | 4/2007 | Bergkvist | ................. | B62D 1/20 403/359.5 |
| 8,133,142 B2 * | 3/2012 | Gerlich | .................... | F16D 1/108 474/166 |
| 2003/0188918 A1 * | 10/2003 | Shimizu | ............... | B62D 5/0424 180/444 |
| 2004/0221668 A1 * | 11/2004 | Saruwatari | ........... | B62D 5/0412 74/388 PS |
| 2005/0119077 A1 * | 6/2005 | Faucon | ................. | F16D 1/0858 474/170 |
| 2005/0121251 A1 * | 6/2005 | Ueno | ................... | B62D 5/0409 180/444 |

(Continued)

*Primary Examiner* — Henry Y Liu
(74) *Attorney, Agent, or Firm* — Dickinson Wright PLLC

(57) ABSTRACT

An electric power steering drive pulley assembly includes a motor shaft. The pulley assembly also includes a drive pulley coupled to the motor shaft. The drive pulley includes a radial retention portion having an inner diameter defining a first portion of a central opening that the motor shaft is disposed within. The drive pulley also includes an axial retention portion extending in the axial direction from the radial retention portion, the axial retention portion defining a second portion of the central opening that the motor shaft is disposed within, the inner diameter of the axial retention portion in splined engagement with the motor shaft to rotationally couple the drive pulley to the motor shaft, the axial retention portion including a flange protruding radially inwardly from the inner diameter of the axial retention portion to be disposed in a groove of the motor shaft.

20 Claims, 6 Drawing Sheets

(56) References Cited

U.S. PATENT DOCUMENTS

| | | | |
|---|---|---|---|
| 2005/0133297 A1* | 6/2005 | Chikaraishi | F16H 7/14 180/444 |
| 2009/0294200 A1* | 12/2009 | Ross | F16F 1/028 180/402 |
| 2013/0048411 A1* | 2/2013 | Lee | B62D 5/0448 180/444 |
| 2015/0060187 A1* | 3/2015 | Yamaguchi | B62D 5/0445 180/444 |
| 2015/0225012 A1* | 8/2015 | Yamaguchi | B62D 5/0424 180/444 |
| 2016/0047456 A1* | 2/2016 | Kolloch | F16H 55/171 474/161 |
| 2017/0030448 A1* | 2/2017 | Urban | B62D 5/0424 |

\* cited by examiner

ELECTRIC POWER STEERING POLYMER DRIVE PULLEY

FIELD OF THE INVENTION

This disclosure generally relates to steering systems and, more particularly to an electric power steering polymer drive pulley.

BACKGROUND

Vehicle steering systems typically include a driver interface, such as a steering wheel that is connected to one end of a steering column. When the driver rotates the steering wheel, the angular motion is transferred to the steering column that then rotates. Another end of the steering column is connected to the steered wheels of the vehicle through, for example, a rack and pinion gear. As the steering column rotates, the rack and pinion gear effects turning of the wheels to steer the vehicle in a desired direction.

Many steering systems include a steering assist mechanism which reduces an amount of force a driver must apply to rotate the steering wheel a desired amount. A typical mechanism includes a motor shaft of an electric motor that drives the assist mechanism. Some assist mechanisms include a pulley assembly that is actuated by the transfer of rotation from the motor shaft to a drive pulley that, in turn, drives rotation of one or more pulleys via one or more belts.

A typical drive pulley is made from sintered iron that requires post processing to achieve the correct bore diameter. Such designs rely on friction due to the interference fit to transmit the motor torque to the synchronous belt. Assembly of the above-described design requires a press machine to assemble the pulley to the motor shaft. An assembly that reduces the cost associated with material and assembly processes would be well received in the art.

SUMMARY

According to one aspect of the disclosure, an electric power steering drive pulley assembly includes a motor shaft extending in an axial direction from an electric motor. The pulley assembly also includes a drive pulley coupled to the motor shaft and disposed between the motor shaft and a belt to transmit rotation of the motor shaft to the belt. The drive pulley includes a radial retention portion having an inner diameter defining a first portion of a central opening that the motor shaft is disposed within, the radial retention portion transmitting a radial load of the belt to the motor shaft. The drive pulley also includes an axial retention portion extending in the axial direction from the radial retention portion, the axial retention portion defining a second portion of the central opening that the motor shaft is disposed within, the inner diameter of the axial retention portion in splined engagement with the motor shaft to rotationally couple the drive pulley to the motor shaft, the axial retention portion including a flange protruding radially inwardly from the inner diameter of the axial retention portion to be disposed in a groove of the motor shaft to axially retain the drive pulley relative to the motor shaft.

According to another aspect of the disclosure, an electric power steering drive pulley assembly includes a motor shaft extending in an axial direction from an electric motor. The pulley assembly also includes a drive pulley coupled to the motor shaft and disposed between the motor shaft and a belt to transmit rotation of the motor shaft to the belt. The drive pulley is formed of a polymer material. The drive pulley includes a radial retention portion having an inner diameter defining a first portion of a central opening that the motor shaft is disposed within, the radial retention portion transmitting a radial load of the belt to the motor shaft. The drive pulley also includes an axial retention portion extending in the axial direction from the radial retention portion, the axial retention portion defining a second portion of the central opening that the motor shaft is disposed within, the inner diameter of the axial retention portion in splined engagement with the motor shaft to rotationally couple the drive pulley to the motor shaft, the axial retention portion including a first arcuate portion and a second arcuate portion that are separated from each other with an axially extending slot to provide flexibility for the axial retention portion.

According to another aspect of the disclosure, a drive pulley for coupling to a motor shaft of an electric motor that powers a vehicle electric power steering system is provided. The drive pulley includes a radial retention portion having an inner diameter defining a first portion of a central opening that the motor shaft is disposed within. The drive pulley also includes an axial retention portion extending in the axial direction from the radial retention portion, the axial retention portion defining a second portion of the central opening that the motor shaft is disposed within, the axial retention portion including a flange protruding radially inwardly from the inner diameter of the axial retention portion to be disposed in a groove of the motor shaft to axially retain the drive pulley relative to the motor shaft, the axial retention portion including a first arcuate portion and a second arcuate portion that are separated from each other with an axially extending slot to provide flexibility for the axial retention portion, the drive pulley formed of a polymer material.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the present disclosure will be described with reference to specific embodiments, it is to be understood that the disclosed embodiments are merely illustrative of the present disclosure that may be embodied in various and alternative forms. Various elements of the disclosed embodiments may be combined or omitted to form further embodiments of the present disclosure. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
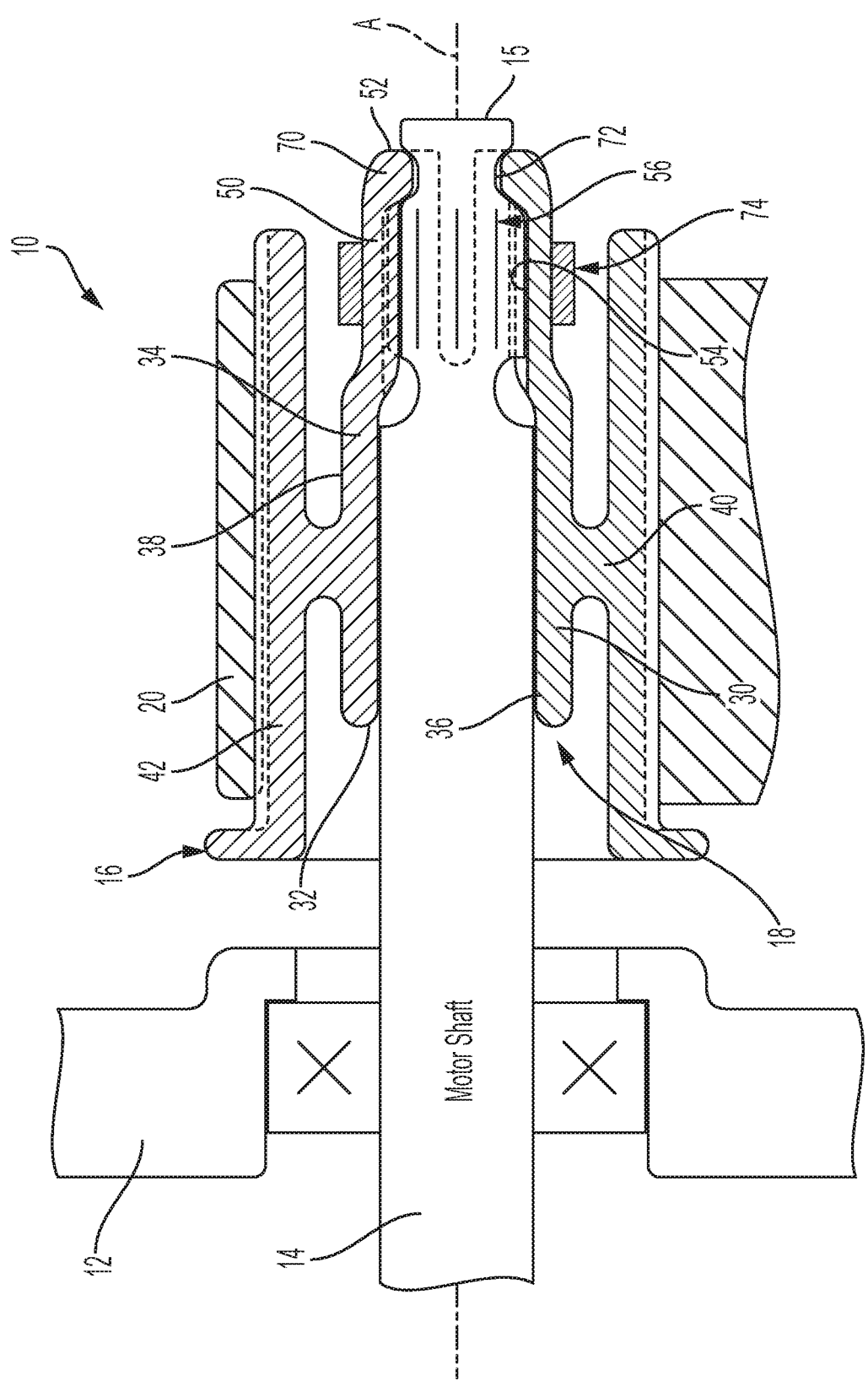
FIG. 1 is a schematic, sectional view of a drive pulley assembly.
Figure 2:
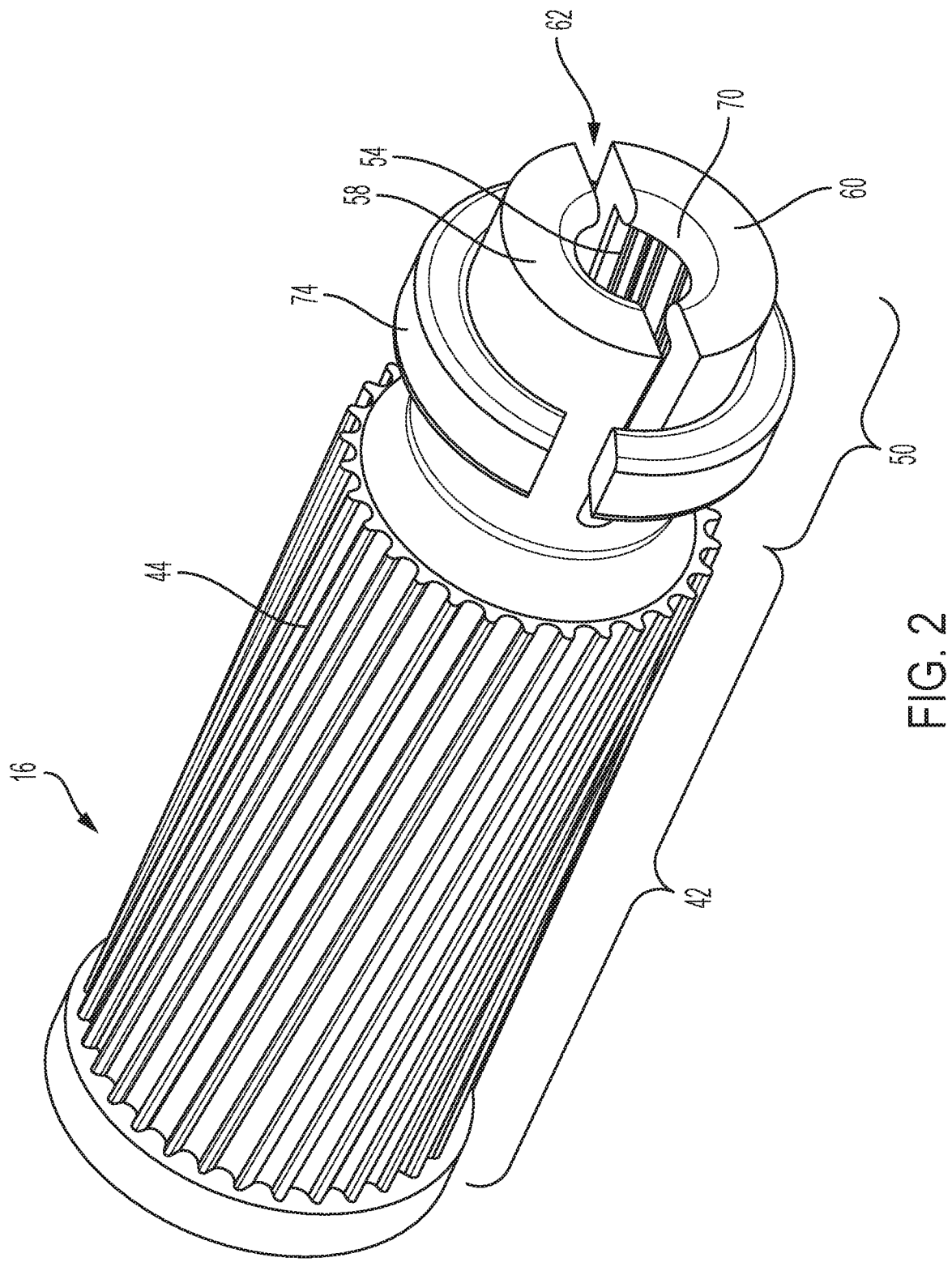
FIG. 2 is a first end perspective view of a drive pulley of the drive pulley assembly.
Figure 3:
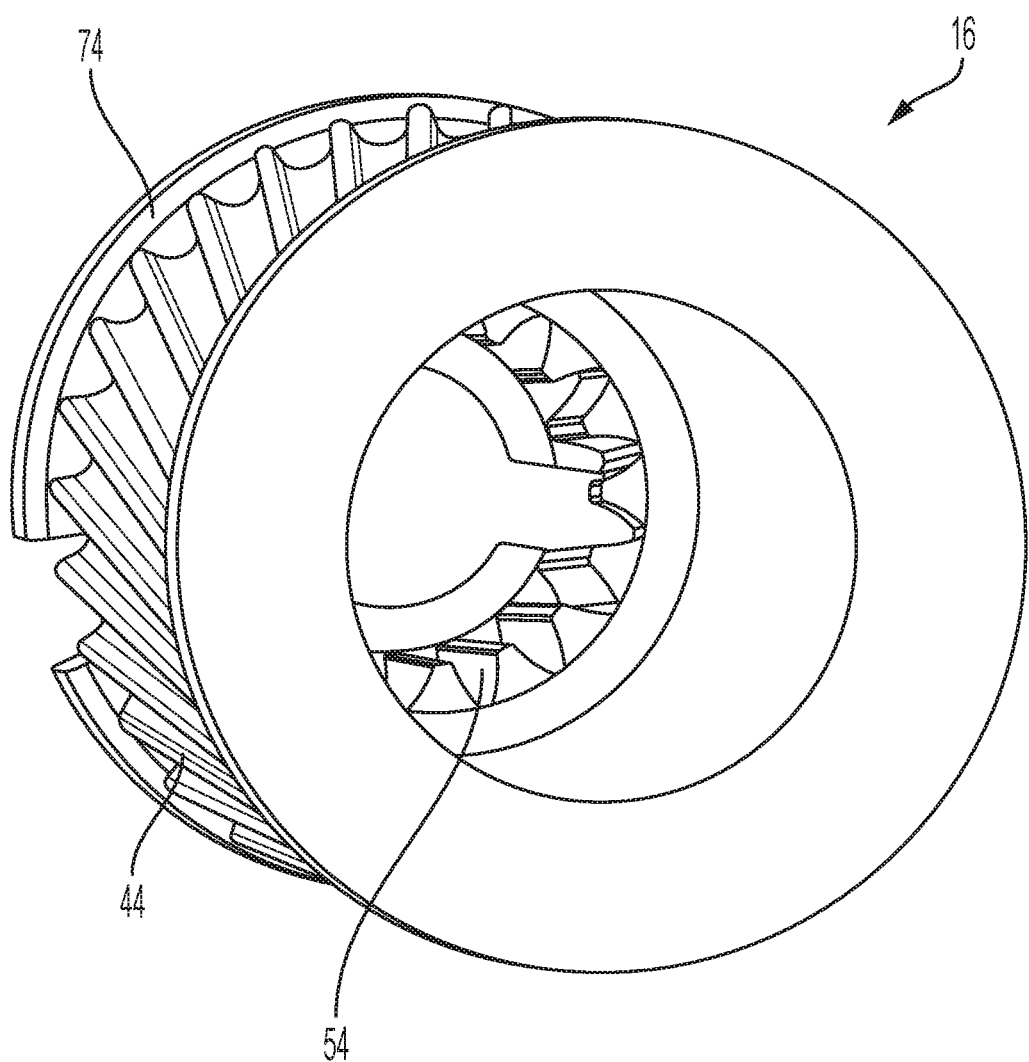
FIG. 3 is a second end perspective view of the drive pulley.
Figure 4:
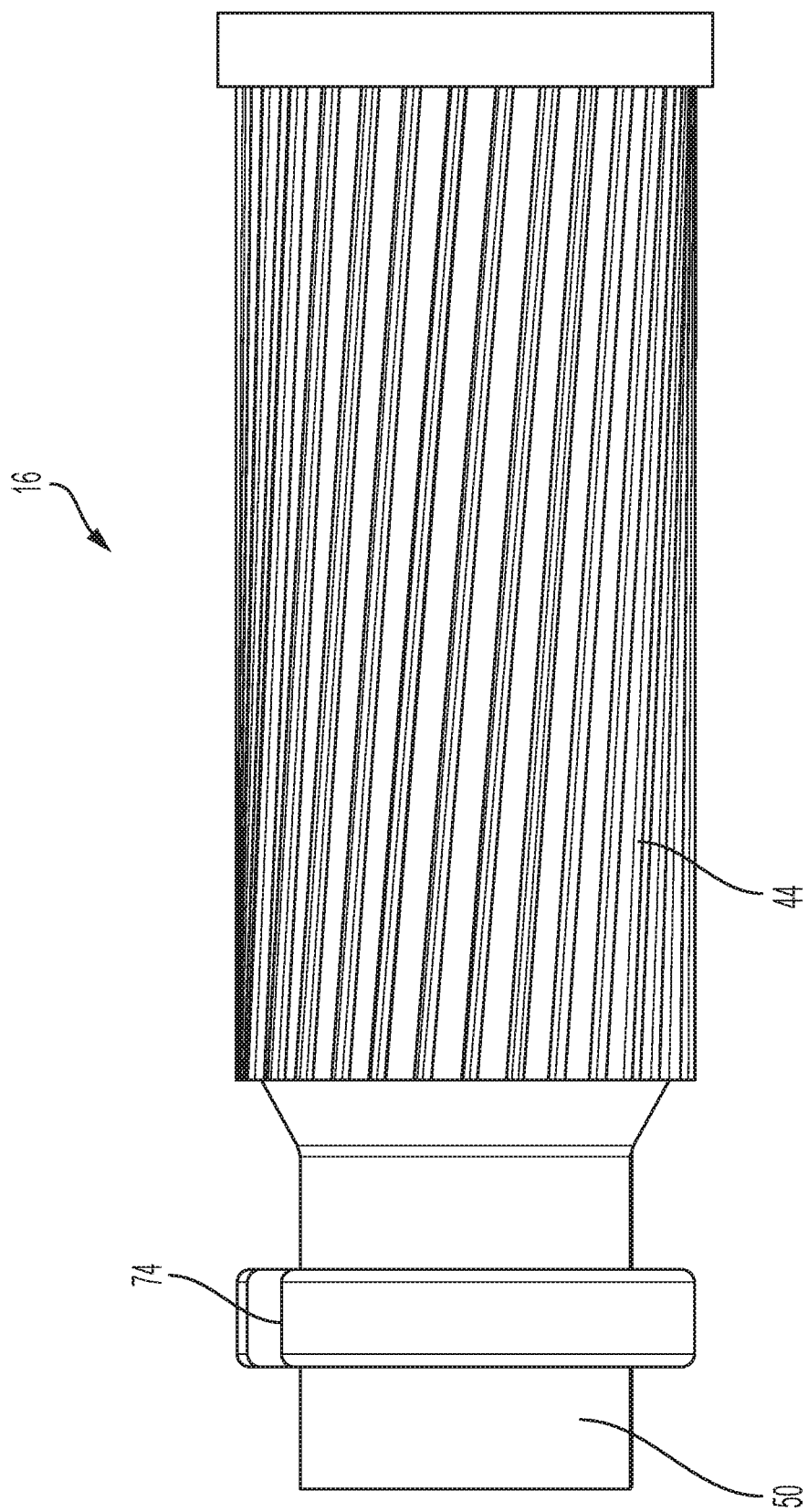
FIG. 4 is a side, elevational view of the drive pulley.
Figure 5:
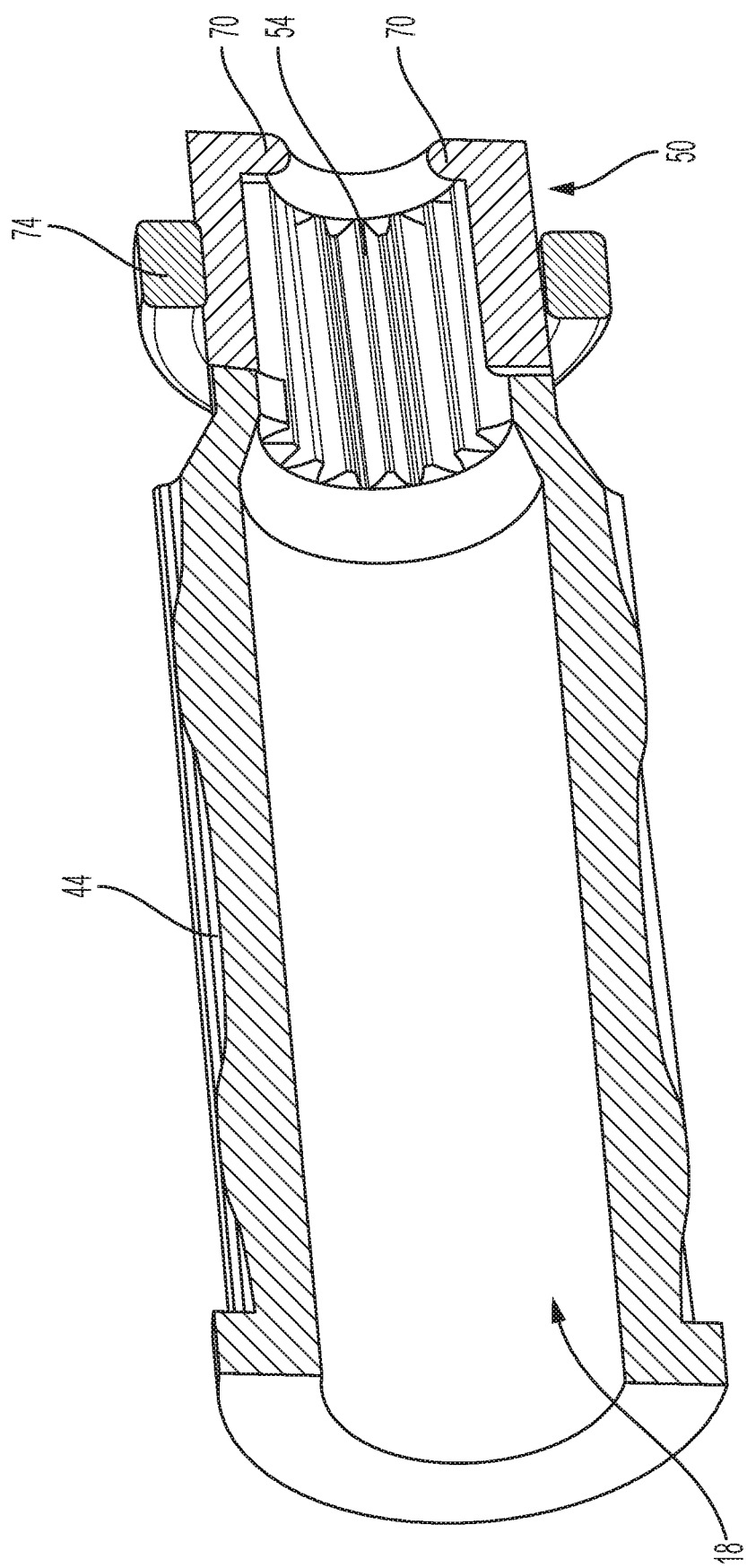
FIG. 5 is a cross-sectional view of the drive pulley.
Figure 7:
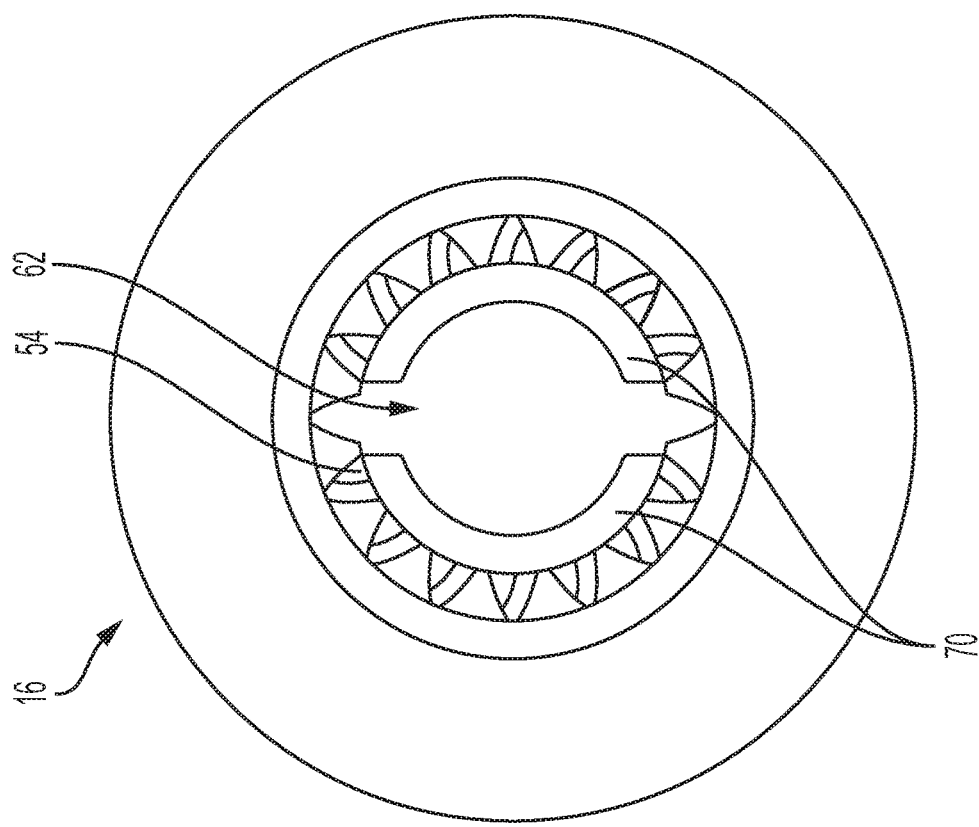
FIG. 7 is a second end, elevational view of the drive pulley.
Figure 6:
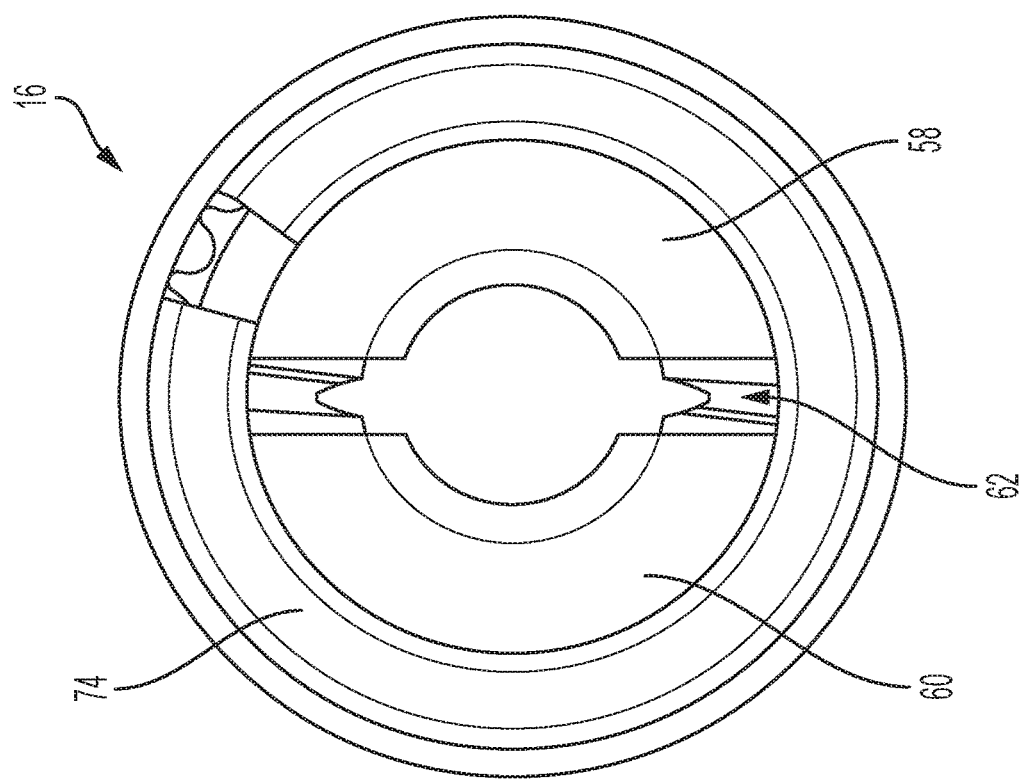
FIG. 6 is a first end, elevational view of the drive pulley.

FIG. 1 illustrates a portion of an electric power steering (EPS) system 10. The EPS system may be used in conjunction with a motor vehicle. The EPS system 10 includes a power pack with a power device, such as an electric motor (not shown). The power pack is an assembly that includes various components, such as a motor in a motor housing 12 and a controller. A motor shaft 14 extends in an axial direction A away from the power pack to a shaft distal end 15, relative to the electric motor.

A drive pulley 16 is coupled to the motor shaft 14. The drive pulley 16 is at least partially formed of a polymer material. In some embodiments, the drive pulley 16 is an injection molded polymer drive pulley. The drive pulley 16 defines a substantially cylindrical opening 18 that extends in the axial direction A. The opening 18 is sized to surround a portion of the motor shaft 14 therein. A portion of the drive pulley 16 is positioned between the motor shaft 14 and a belt 20. The belt 20 surrounds the drive pulley 16 and a driven pulley (not shown) to transfer rotation of the drive pulley 16 to the driven pulley, which ultimately results in transmission of an assist force for steering maneuvers. For example, the assist force may be provided to a rack member (not shown) of a steering system to impart rotation of road wheels.

Although the drive pulley assembly described herein references a rack electric power steering system, it is to be appreciated that the scope of the disclosed invention contemplates other applications that would benefit from the drive pulley assembly.

FIGS. 2-7 illustrate the drive pulley 16 in additional detail. Referring to FIGS. 2-7, with continued reference to FIG. 1, the drive pulley 16 includes a radial retention portion 30 extending from a first end 32 to a second end 34. The radial retention portion 30 extends radially from an inner diameter 36 to an outer diameter 38. The inner diameter 36 surrounds a portion of the motor shaft 14. In some embodiments, the inner diameter 36 and the motor shaft 14 are in an interference press fit condition. In other embodiments, the inner diameter 36 and the motor shaft have a slip fit relationship.

An annular web 40 extends radially outwardly from the radial retention portion 30 to connect the radial retention portion 30 to a toothed portion 42 of the drive pulley 16. The annular web 40 is used for certain applications, as shown in FIG. 1, however, other embodiments with differing design requirements (e.g., level of interference between shaft and pulley, final outer diameter tolerance sensitivity, moldability, etc.) do not require such a web 40, as shown in FIGS. 2-7. The toothed portion 42 has an outer diameter surface that includes a plurality of teeth 44 to engage the belt 20. The radial retention portion 30 transmits the radial load of the belt 20 to the motor shaft 14. Embodiments providing the annular web 40 provide dimensional isolation of the tooth interface from the radial retention portion, as it reduces the expansion due to the press fit. The annular web 40 also aids in manufacture of the pulley by minimizing thick sections that are problematic in injection molding. The annular web 40 also reduces mass for large pulleys.

An axial retention portion 50 of the drive pulley 16 extends axially away from the second end 34 of the radial retention portion 30 to a drive pulley distal end 52. As with the radial retention portion 30, the axial retention portion 50 extends radially outwardly from an inner diameter to an outer diameter. The inner diameter of the axial retention portion 50 defines a remainder of the central opening 18, in combination with the inner diameter of the radial retention portion 30. In some embodiments, the cross-sectional area of the central opening 18 remains substantially constant along its entire axial distance. However, in some embodiments the opening 18 tapers to reduce the cross-sectional area as the opening transitions from the portion defined by the radial retention portion 30 to the portion defined by the axial retention portion 50. The inner diameter of the axial retention portion 50 has splines 54 thereon to rotationally couple to a splined region 56 of the motor shaft 14.

The axial retention portion 50 includes a first arcuate portion 58 and a second arcuate portion 60 that are separated from each other with an axially extending slot 62. In other words, the axial retention portion 50 does not extend continuously in a circumferential direction. The arcuate portions 58, 60 are semi-circular in cross-section in some embodiments. The slot 62 provides a break in material between the first arcuate portion and the second arcuate portion 60. The break in material provides flexibility for the axial retention portion 50 since the drive pulley 16 is formed of a material, such as polymer, that is not as rigid as metal. This is beneficial during assembly of the drive pulley 16 to the motor shaft 14. In particular, the motor shaft 14 can be inserted within the central opening 18 of the drive pulley 16 (or drive pulley 16 installed over the motor shaft 14), while accommodating a radially inwardly protruding axial retention feature 70 of the axial retention portion 50.

While the axial retention portion 50 is described above as having two arcuate portions 58, 60, it is to be understood that the axial retention portion 50 may include more arcuate portions that are each separated by a respective slot 62. In such embodiments, the arcuate portions are axially extending fingers.

The axial retention feature 70 is any radially inwardly protruding structure, such as a flange, for example, and provides axial retention of the drive pulley 16 relative to the motor shaft 14. During assembly, the drive pulley 16 is slid axially over the motor shaft 14, relative to the motor shaft 14, until the axial retention feature 70 is positioned within a recessed groove 72 of the motor shaft 14. The recessed groove 72 is located proximate the distal end 15 of the motor shaft 14 and the axial retention feature 70 is located at the drive pulley distal end 52 in some embodiments. The flexible capability of the axial retention portion 50 allows the arcuate portions 58, 60 to deflect outwardly during assembly to allow the axial retention feature 70 to move over the outer diameter of the motor shaft 14 until the axial retention feature 70 is positioned in (e.g., snapped into) the recessed groove 72 of the motor shaft 14.

Once the drive pulley 16 and the motor shaft 14 are in an assembled condition (i.e., axial retention feature 70 within groove 72), the capability of the axial retention portion 50 to deflect is eliminated with a compression ring 74 that surrounds the axial retention portion 50. In some assembly processes, the compression ring 74 is assembled to the drive pulley 16 prior to assembling the drive pulley 16 to the motor shaft 14. In other embodiments, a compression ring is not necessary at all. In some embodiments, the compression ring 74 is a split metal ring, such as a split steel ring.

The embodiments disclosed herein reduce the cost of the drive pulley.

While the invention has been described in detail in connection with only a limited number of embodiments, it should be readily understood that the invention is not limited to such disclosed embodiments. Rather, the invention can be

Having thus described the invention, it is claimed:

1. An electric power steering drive pulley assembly comprising:
a motor shaft extending in an axial direction from an electric motor; and
a drive pulley coupled to the motor shaft and disposed between the motor shaft and a belt to transmit rotation of the motor shaft to the belt, the drive pulley comprising:
a radial retention portion having an inner diameter defining a first portion of a central opening that the motor shaft is disposed within, the radial retention portion transmitting a radial load of the belt to the motor shaft; and
an axial retention portion extending in the axial direction from the radial retention portion, the axial retention portion defining a second portion of the central opening that the motor shaft is disposed within, the inner diameter of the axial retention portion in splined engagement with the motor shaft to rotationally couple the drive pulley to the motor shaft, the axial retention portion including a flange protruding radially inwardly from the inner diameter of the axial retention portion to be disposed in a groove of the motor shaft to axially retain the drive pulley relative to the motor shaft.

2. The electric power steering drive pulley assembly of claim 1, wherein the drive pulley is formed of a polymer material.

3. The electric power steering drive pulley assembly of claim 1, wherein the flange of the axial retention portion of the drive pulley is located at an axial end of the drive pulley.

4. The electric power steering drive pulley assembly of claim 3, wherein the axial end that the flange is located at is a distal end of the drive pulley relative to the electric motor location.

5. The electric power steering drive pulley assembly of claim 1, wherein the axial retention portion of the drive pulley comprises a plurality of arcuate portions that are each separated from each other with at least one axially extending slot to provide flexibility for the axial retention portion.

6. The electric power steering drive pulley assembly of claim 5, wherein the plurality of arcuate portions include a first arcuate portion and a second arcuate portion that each have a semi-circular cross-section.

7. The electric power steering drive pulley assembly of claim 5, further comprising a compression ring surrounding the axial retention portion.

8. The electric power steering drive pulley assembly of claim 7, wherein the compression ring is a split metal ring.

9. The electric power steering drive pulley assembly of claim 1, further comprising a toothed portion on an outer diameter of the drive pulley to engage the belt.

10. The electric power steering drive pulley assembly of claim 9, wherein the toothed portion of the outer diameter of the drive pulley is connected to the radial retention portion with an annular web.

11. An electric power steering drive pulley assembly comprising:
a motor shaft extending in an axial direction from an electric motor; and
a drive pulley coupled to the motor shaft and disposed between the motor shaft and a belt to transmit rotation of the motor shaft to the belt, the drive pulley formed of a polymer material and comprising:
a radial retention portion having an inner diameter defining a first portion of a central opening that the motor shaft is disposed within, the radial retention portion transmitting a radial load of the belt to the motor shaft; and
an axial retention portion extending in the axial direction from the radial retention portion, the axial retention portion defining a second portion of the central opening that the motor shaft is disposed within, the inner diameter of the axial retention portion in splined engagement with the motor shaft to rotationally couple the drive pulley to the motor shaft, the axial retention portion including a first arcuate portion and a second arcuate portion that are separated from each other with an axially extending slot to provide flexibility for the axial retention portion.

12. The electric power steering drive pulley assembly of claim 11, wherein the first arcuate portion and the second arcuate portion each have a semi-circular cross-section.

13. The electric power steering drive pulley assembly of claim 12, further comprising a compression ring surrounding the axial retention portion.

14. The electric power steering drive pulley assembly of claim 13, wherein the compression ring is a split metal ring.

15. The electric power steering drive pulley assembly of claim 11, further comprising a flange protruding radially inwardly from the inner diameter of the axial retention portion to be disposed in a groove of the motor shaft to axially retain the drive pulley relative to the motor shaft.

16. The electric power steering drive pulley assembly of claim 15, wherein the flange of the axial retention portion of the drive pulley is located at an axial end of the drive pulley.

17. The electric power steering drive pulley assembly of claim 16, wherein the axial end that the flange is located at is a distal end of the drive pulley relative to the electric motor location.

18. The electric power steering drive pulley assembly of claim 11, further comprising a toothed portion on an outer diameter of the drive pulley to engage the belt.

19. The electric power steering drive pulley assembly of claim 18, wherein the toothed portion of the outer diameter of the drive pulley is connected to the radial retention portion with an annular web.

20. A drive pulley for coupling to a motor shaft of an electric motor that powers a vehicle electric power steering system, the drive pulley comprising:
a radial retention portion having an inner diameter defining a first portion of a central opening that the motor shaft is disposed within; and
an axial retention portion extending in the axial direction from the radial retention portion, the axial retention portion defining a second portion of the central opening that the motor shaft is disposed within, the axial retention portion including a flange protruding radially inwardly from the inner diameter of the axial retention portion to be disposed in a groove of the motor shaft to axially retain the drive pulley relative to the motor shaft, the axial retention portion including a first arcuate portion and a second arcuate portion that are separated from each other with an axially extending slot to provide flexibility for the axial retention portion, the drive pulley formed of a polymer material.

* * * * *